US011390387B2

(12) United States Patent
Chauvet et al.

(10) Patent No.: US 11,390,387 B2
(45) Date of Patent: Jul. 19, 2022

(54) DE-ICING SYSTEM AND METHOD

(71) Applicant: Ratier-Figeac SAS, Figeac (FR)

(72) Inventors: Louis Chauvet, Auzeville-Tolosane (FR); Pierre-Alex Picard, Figeac (FR); Romain Bouloc, Saint Félix (FR); Thibaut Marger, Beduer (FR)

(73) Assignee: RATIER-FIGEAC SAS, Figeac (FR)

( * ) Notice: Subject to any disclaimer, the term of this patent is extended or adjusted under 35 U.S.C. 154(b) by 297 days.

(21) Appl. No.: 16/532,725

(22) Filed: Aug. 6, 2019

(65) Prior Publication Data
US 2020/0140099 A1 May 7, 2020

(30) Foreign Application Priority Data
Nov. 7, 2018 (EP) ..................... 18306459

(51) Int. Cl.
*B64D 15/22* (2006.01)
*B64D 15/12* (2006.01)

(52) U.S. Cl.
CPC ............. *B64D 15/22* (2013.01); *B64D 15/12* (2013.01)

(58) Field of Classification Search
CPC ......... B64D 15/12; B64D 15/20; B64D 15/22
See application file for complete search history.

(56) References Cited

U.S. PATENT DOCUMENTS

| 2,766,619 | A | * | 10/1956 | Tribus | B64D 15/20 |
| | | | | | 73/170.26 |
| 2,908,792 | A | * | 10/1959 | Frank | B64D 15/12 |
| | | | | | 219/202 |
| 3,657,514 | A | | 4/1972 | Adams | |
| 4,980,673 | A | * | 12/1990 | Kleven | G08B 19/02 |
| | | | | | 244/134 F |
| 5,709,470 | A | | 1/1998 | Finley | |
| 6,279,856 | B1 | | 8/2001 | Rutherford et al. | |
| 6,347,767 | B1 | * | 2/2002 | Holmen | B64D 15/20 |
| | | | | | 244/134 F |
| 7,523,889 | B2 | * | 4/2009 | Bourjac | B64D 15/12 |
| | | | | | 244/134 D |
| 9,656,757 | B2 | | 5/2017 | Henze | |

(Continued)

FOREIGN PATENT DOCUMENTS

| EP | 2428447 A2 | 3/2012 |
| EP | 2562085 A2 | 2/2013 |

(Continued)

OTHER PUBLICATIONS

Extended European Search Report for International Application No. 18306459.1 dated Apr. 17, 2019, 7 pages.

*Primary Examiner* — Philip J Bonzell
*Assistant Examiner* — Michael B. Kreiner
(74) *Attorney, Agent, or Firm* — Cantor Colburn LLP

(57) ABSTRACT

A method of detecting that ice has been shed from an external surface of a component is provided, the method comprising applying power to a heating means to provide heat to said external surface. The method further comprises sensing the temperature of the component and calculating the rate of change of temperature increase of the external surface over time. Further, the method comprises detecting a change in said rate of change of temperature increase over time, wherein said detected change in rate of change of temperature increase indicates that said ice has been shed from said external surface of said component.

13 Claims, 3 Drawing Sheets

(56) References Cited

U.S. PATENT DOCUMENTS

| | | | |
|---|---|---|---|
| 9,745,070 B2 | 8/2017 | Brouwers et al. | |
| 2011/0240621 A1* | 10/2011 | Kessler | G01N 25/00 |
| | | | 219/200 |
| 2012/0061482 A1* | 3/2012 | Stothers | H05B 1/0236 |
| | | | 237/2 R |
| 2014/0191084 A1* | 7/2014 | Gambino | B64D 15/12 |
| | | | 244/134 D |
| 2016/0159485 A1* | 6/2016 | Le Garrec | B64D 15/12 |
| | | | 244/134 D |
| 2018/0327100 A1* | 11/2018 | Froman | B64D 15/20 |
| 2019/0152614 A1* | 5/2019 | Opificius | B64D 15/22 |

FOREIGN PATENT DOCUMENTS

| | | | |
|---|---|---|---|
| EP | 2428447 A3 | 8/2014 | |
| EP | 2762407 A1 | 8/2014 | |
| EP | 2562085 A3 | 4/2016 | |
| FR | 2914906 A1 | 10/2008 | |
| WO | 8809980 A1 | 12/1988 | |

* cited by examiner

DE-ICING SYSTEM AND METHOD

FOREIGN PRIORITY

This application claims priority to European Patent Application No. 18306459.1 filed Nov. 7, 2018, the entire contents of which is incorporated herein by reference.

FIELD OF TECHNOLOGY

The examples described herein relate to the field of de-icing, and more particularly, but not exclusively, to the field of de-icing of components of an aircraft such as a propeller or propellers.

BACKGROUND OF THE INVENTION

Accumulation of ice on an aircraft wing or blade of a propeller (and other aircraft structures) during flight is a known issue and can lead to problems in the operation of the aircraft. One technique that has been utilised to prevent such excessive ice formation is thermal de-icing, wherein aircraft structures prone to ice accretion are actively heated to prevent ice formation or loosen accumulated ice.

Known propeller de-icing systems typically heat the propeller based on the measured conditions at which the propeller operates. In some examples, a control unit controls a heating cycle of the de-icer based on a function of conditions such as the calibrated air speed (CAS) and the outside air temperature (OAT) of the aircraft. The control unit will cause heating of the blades of the propeller for a number of cycles and ice-shedding will typically occur during the second or third heating cycle.

U.S. Pat. No. 9,656,757 B2 describes a propeller de-icing system that uses a de-icing heater timing cycle. The heater on/heater off schedule is calculated as a function of ambient temperature and the airspeed of the aircraft.

SUMMARY OF THE INVENTION

In one example, there is provided a method of detecting that ice has been shed from an external surface of a component. The method comprises applying power to a heating means to provide heat to said external surface, and sensing the temperature of the component. The method also comprises calculating the rate of change of temperature increase of the external surface over time and detecting a change in said rate of change of temperature increase over time. Said detected change in rate of change of temperature increase indicates that said ice has been shed from said external surface of said component.

Further, a method of de-icing an external surface of a component is also provided, the method comprising performing the method steps as outlined above on said component, and the method further comprising, in response to the detection of said ice being shed from said external surface, reducing or stopping the power applied to said heating means.

The method may also further comprise providing the sensed temperature as feedback to a closed loop controller.

The component may be a blade of an aircraft propeller. Said aircraft propeller may comprise a plurality of said blades, and said method may further comprise allocating said blades to at least a first group and a second group of blades. Said step of providing heat may be only performed on said first group of blades, whilst no heat is provided to said second group of blades, and upon the detection that said ice has been shed from said first group of blades, the power to the heating means of the first group of blades may be reduced or stopped whilst applying power to the heating means of the second group of blades.

Said blades may be allocated by being numbered sequentially based on their position relative to each other, and said first group of blades may comprise odd numbered blades and the second group of blades may comprise even numbered blades, or vice versa.

Said blades may be allocated by being numbered sequentially based on their position relative to each other and wherein said first group of blades may comprise blades numbered as 1, 4 and 7, said second group of blades may be numbered as 2, 5 and 8 and further comprising a third group of blades that may be numbered as 3, 6 and 9.

In another example, a system for detecting that ice has been shed from an external surface of a component is provided. The system comprises a heating means configured to receive power to provide heat to said external surface, a means for sensing the temperature of the component, a controller configured to calculate the rate of change of temperature increase over time; and said controller being further configured to detect a change in said rate of change of temperature increase over time. The detected change in rate of change of temperature increase indicates that said ice has been shed from said external surface of said component.

Upon detection that said ice has been shed from said external surface, the controller may be further configured to reduce or stop the power applied to said heating means. The component may be a blade of an aircraft propeller.

Said aircraft propeller may comprise a plurality of said blades, said blades may be allocated into at least a first group and a second group of blades, and said controller may be configured to provide heat only to said first group of blades whilst not applying any heat to said second group of blades. Upon the detection that said ice has been shed from said first group of blades, said controller may be configured to reduce or stop the power to the heating means of the first group of blades whilst applying power to the heating means of a second group of blades.

The controller may be provided on the rotary hub of said propeller. Said controller may be a closed loop controller with component skin temperature feedback. The means for sensing the temperature of the component may be disposed on an external surface of the component. Alternatively, the means for sensing the temperature of the component may be disposed within an internal structure of the component.

DETAILED DESCRIPTION OF THE INVENTION

The examples described herein aim to overcome problems associated with known propeller blade de-icing systems. For example, such known systems that de-ice by heating the propeller blade based on measured conditions have been found to be inefficient. This is because they operate on an open loop control system and cannot detect when ice has been shed, and so they continue to heat the blade even after the accumulated ice has been shed when heating is no longer required. This can lead to water being left on the blade as well as excessive power consumption.

The examples described herein overcome these problems by providing a system and method that is able to detect the shedding of ice and then react to this ice shedding event in a power efficient manner to continue the de-icing process using a closed loop control with component temperature feedback. Such temperature feedback indicates to the control system when the ice has been shed, and therefore when the heating of the component may end, thereby closing the control loop.

Whilst the systems and methods described herein are described mainly in relation to an aircraft propeller and its blades, it is also envisaged that the systems and methods may be used with any component that may be prone to icing. The examples described herein may therefore be used in any component that is, in use, subject to ice accretion, i.e. wherein ice slowly accumulates on the component.

Figure 1:
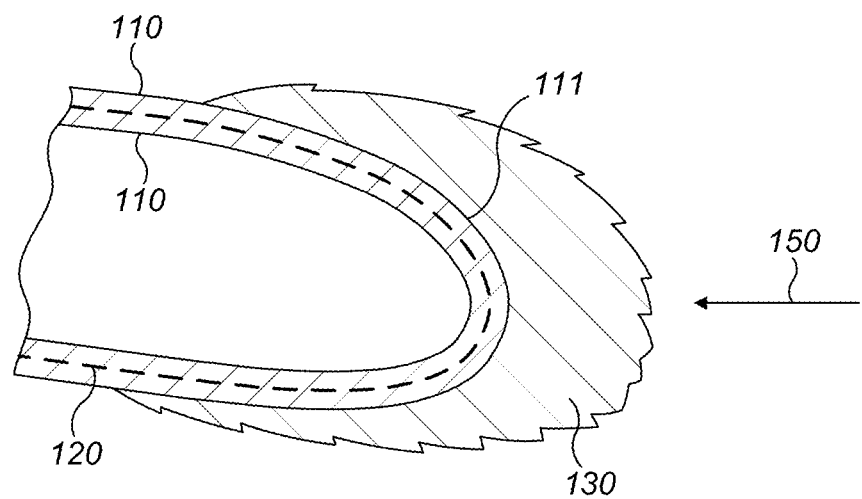
FIG. 1 shows an exemplary cross-section of an aircraft propeller blade with ice accumulated on the external surface of the blade.

As can be seen in FIG. 1, a propeller blade 110 may be provided with a heating device 120 associated with its outermost or external surface 111, i.e. the surface of the blade 110 that is in contact with the external environment 150. In this example shown in FIG. 1, a heating device 120 is disposed within the internal structure of the propeller blade 110, itself. Alternatively, a heating device 120 may be attached to the external surface 111 of the propeller blade 110.

Figure 3A:
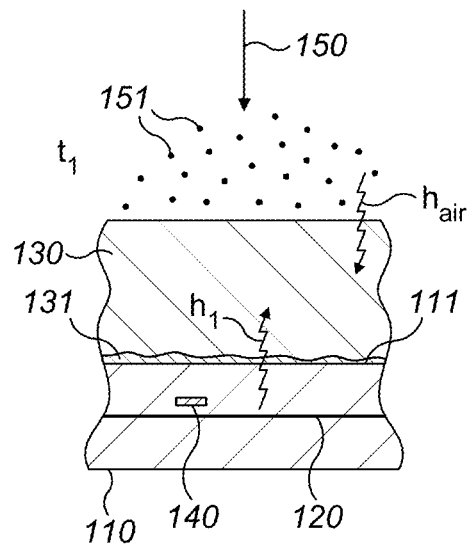
FIG. 3a shows a cross-section of a section of a propeller blade with ice accumulated on the external surface at time $t_1$.
Figure 3B:
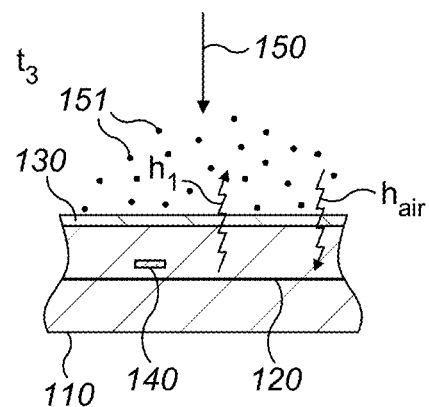
FIG. 3b shows a cross-section of a section of a propeller blade with ice accumulated on the surface at time $t_3$.

As shown in FIGS. 1, 3a and 3b, in use, the propeller blade 110 may be subjected to an airflow 150, which may result in a layer of ice 130 accreting on the surface of the propeller blade 110. In response to this, the heating device 120 associated with the propeller blade 110 may be powered so as to heat up at least the external surface 111 of the propeller blade 110 and shed the ice 130 as described below.

The de-icing systems described herein may also comprise a controller (not shown) that is configured to control the heating of the heating device 120. The controller may be disposed on a rotary hub of the propeller from which the blades 110 extend.

Further, the de-icing system may comprise a means 140 for sensing the temperature at or close to the external surface 111 of at least one propeller blade 110. The external surface 111 is the surface of the blade 110 that is in contact with the airflow 150 passing over the blade 110 in use. In some examples, each individual blade 110 of the propeller comprises a means for sensing temperature 140. The means for sensing temperature 140 may be one or more of a temperature sensor or a thermocouple. The sensed temperature may be communicated to the controller which is configured to carry out the method depicted in FIG. 2 and described below.

A method for controlling the system above is now described in detail. The method is described herein also with reference to FIG. 2, in which an illustrative series of graphs 10 to 40 are shown sharing the common axis 50 which represents time, t. An exemplary method of de-icing a propeller 110 will now be described with reference to these graphs of FIG. 2.

Graph 10 shows an exemplary ice thickness (thick) that is formed on a propeller blade 110 with respect to time t. Graph 20 depicts the power (W) that may be applied to the heating means 120 of the de-icing system provided on or within the propeller blade 110 with respect to time t. Graph 30 shows a temperature (T°) of the propeller blade 110 that is sensed by the at least one temperature sensing means 140, as described above. Graph 40 depicts the derivative T°' of the sensed temperature T° of the propeller blade 110. That is, graph 40 shows the rate of change of an increase in temperature T° of the propeller blade 110 with respect to time t.

As can be seen in graph 10, in use, the ice 130 may accumulate/accrete on a propeller blade 110 over time t. In response to the accretion of ice 130, the controller may be configured to provide power $W_1$ to the heating means 120 of the de-icing system, as can be seen in graph 20.

The controller may further be configured to perform the step of sensing when the ice 130 formed on the blade(s) 110 has been shed. This is achieved as follows: as shown in graph 10 of FIG. 2, at time $t_1$, the thickness of the ice 130 on the propeller blade 110 has increased from 0 to a first level 1. When such an ice layer 130 forms on the blade 110, the ice 130 acts as an insulation layer to the blade 110. This causes the temperature T° of the propeller 110 to increase as the thickness of ice increases, as shown comparatively in graphs 10 and 30 of FIG. 2.

This situation is further illustrated in FIG. 3a, which shows a cross section of the propeller blade 110 at time $t_1$. In this example, the heating means 120 is providing heat to the propeller blade 110, which is shown as transfer hi in FIG. 3a, whilst the airflow 150 over the blade 110 provides a cooling effect $h_{air}$ as also shown in FIG. 3a. The airflow 150 may further comprise weather contributing to ice accretion 151, such as snow, rain, hail, sleet or the like.

At time $t_1$, a layer of ice 130 of a certain thickness is found on the external surface 111 of propeller blade 110 which insulates the external surface 111 of the propeller blade 110. As a result, heat transfer hi from the heating device 120 is largely prevented from being radiated from the propeller blade 110, and similarly, the cooling effect $h_{air}$ is largely prevented from reaching the propeller 110. As the layer of ice 130 continues to grow, the temperature T° at the external surface of the blade 110 that is sensed by the temperature sensing means 140 continues to increase due to the combination of the heating means 120 being powered and the insulation effect of the ice layer 130, which prevents heat from being radiated from the blade. This increase of temperature T° can be seen in graph 30. The increase in temperature at the external surface 111 of the blade 110 leads to the melting of the ice 131 that is at the interface with the blade's external surface 111. That is, the ice 130 that is present at the interface between the ice layer 131 and the external surface of the blade 110 begins to melt.

Due to the section of melted ice 131 at the external surface of the blade 110, the adhesion between the ice layer 130 and the external surface of the blade 110 accumulated ice layer is compromised, and therefore the accumulated layer of ice 130 that has formed on the blade 110 between time $t_0$ and time $t_2$ detaches from the blade surface 111 so that the ice 130 is shed from the external surface 111 of the blade 110. This shedding of the ice is seen at $t_2$ of the graphs of FIG. 2.

Figure 2:
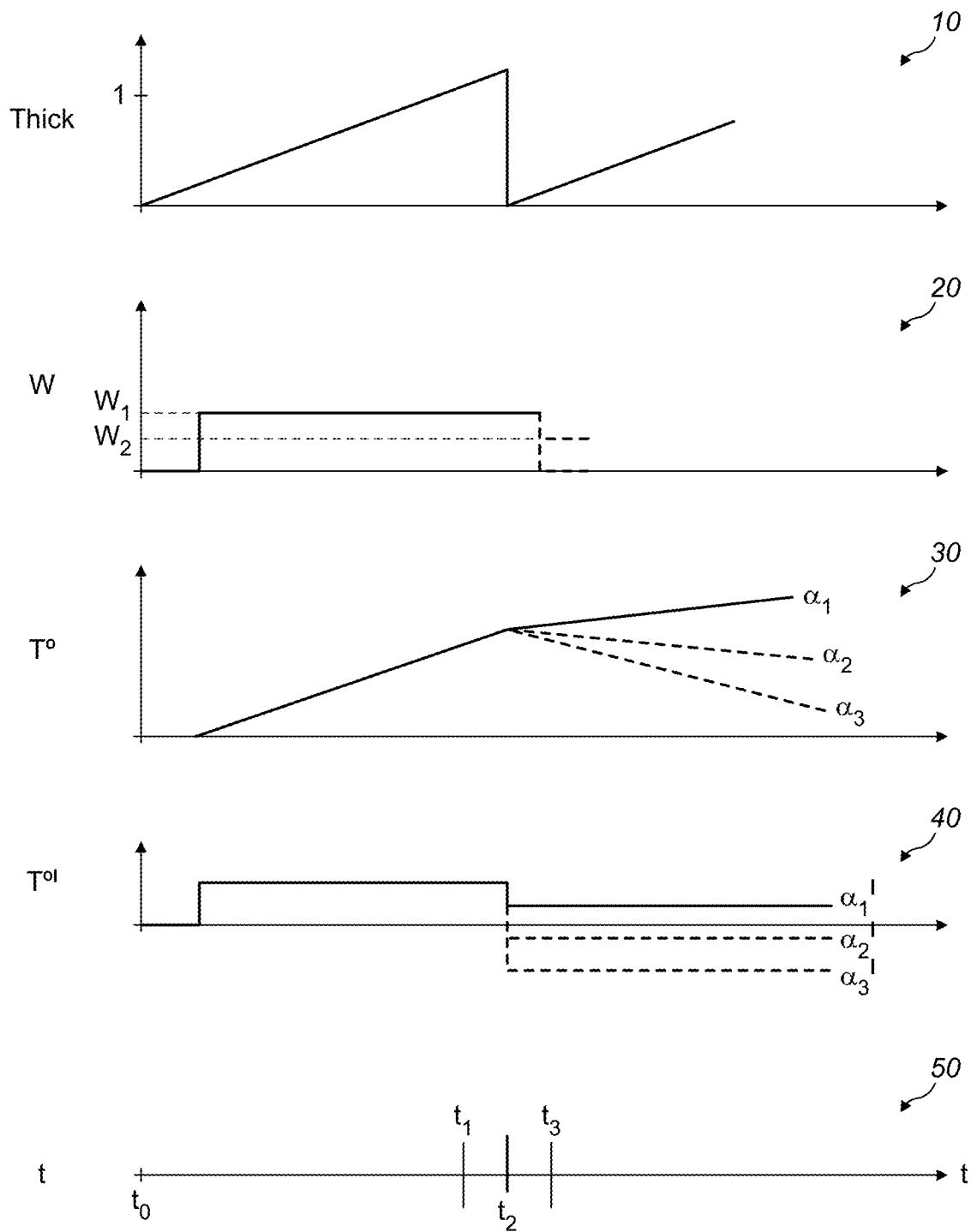
FIG. 2 shows a number of graphs displaying an exemplary timeline of the method for detecting ice shedding as described herein.

When the ice 130 formed on the external surface 111 of the blade 110 is shed, the insulating effect of the ice 130 is lost. A cross-section of the blade 110 at time $t_3$, i.e. a time not long after this ice layer 130 has been shed is shown in FIG. 3b. It can now be seen that no ice/only a thin layer of ice 130 is present on the surface 111 of the propeller blade 110. As a result, the ambient airflow 150 (and its associated cooling effect $h_{air}$) is now able to impinge on the external surface 111 of the propeller blade 110, and therefore this drop in temperature is detected by the temperature sensing means 140 which is associated with and which measures the temperature at or at least near the external surface 111 of the blade 110. This is also shown in FIG. 2, graphs 30 and 40. The ambient cold airflow 150 results in a change in the rate of temperature increase, as can be seen in graph 30. Depending on the exact operating conditions, the temperature may continue to increase at a slower rate as the ice reforms, as can be seen by the change of slope of line $a_1$, or the temperature may even begin to drop, as seen in lines $a_2$ and $a_3$ of graph 30.

In order to detect this change in rate of temperature increase, the controller is configured to calculate the mathematical derivative $T°'$ of the sensed temperature $T°$ against time t (which directly corresponds to the rate of change of temperature increase), as seen in graph 40. If the sensed temperature $T°$ continues to increase at a slower rate than previously, as in example $a_1$, the derivative $a_1'$ of the temperature may remain positive, albeit at a lower amount. When the temperature decreases following the shedding of the ice 130, the derivative of the sensed temperature $a_2'$ and $a_3'$ will turn negative.

The sudden change in the derivative of the sensed temperature therefore indicates that the ice 130 has been shed. In response to detecting this change in the derivative of the sensed increase of temperature, the controller is configured to indicate that the ice 130 has been shed from the external surface 111 of the propeller blade 110. In order to prevent false indications of ice shedding, the controller may be configured to only indicate that the ice 130 has been shed when the change in the derivative of the sensed temperature exceeds a threshold.

A closed loop control is thereby achieved, with this sudden change in derivative of the sensed temperature indicating when the ice 130 has been shed from the blade 110. Once it has been detected that the ice 130 has been shed from the blade, the controller unit may be configured to then reduce the power W provided to the heating means 120 of the blades 110.

For example, and as seen in graph 20 of FIG. 2, following the detection of ice shedding, the power W applied to the heating device 120 of the propeller 110 may be reduced from $W_1$ to $W_2$. Alternatively, power W applied to the heating device 120 may be stopped altogether in response to the detection of the ice 130 shedding.

The moment of ice shedding may be precisely detected using feedback from the propeller blades 110 themselves. This prevents excessive power being consumed by the heating system 120 after the ice 130 has been shed as the de-icing mode may be switched to a mode that requires lower power consumption.

Due to the power intensive requirements of de-icing, it may not be possible or necessary to simultaneously deice all blades 110 at once. Therefore, in addition to the above, the de-icing system and methods described herein may be used on different blades at different times. For example, an aircraft propeller may have any number of blades 110. In some examples, the propeller may be provided with 6 blades, 8 blades, or 9 blades (or any other suitable number of blades). These blades may individually be referred to by assigning each blade a number in sequence. In some examples, e.g. wherein there is an even number of blades, the blades may then be split into "odd" and "even" blades. For example, for a propeller with 8 blades, the blades may be split into "odd" numbered blades, 1, 3, 5 and 7, and "even" numbered blades, 2, 4, 6 and 8.

Whilst some of the examples described herein may relate to an 8-bladed propeller with the above "even" and "odd" numbering, it is envisaged that the teachings herein could equally be applied to a propeller with other numbers of blades. The examples described herein are also not limited to splitting the set of blades into only two groups, of odd and even. For example, a propeller with 9 blades may be split into three groups of blades, such as blade numbers a) 1, 4 and 7, b) 2, 5 and 8 and c) 3, 6 and 9. The system and methods described herein may operate by first only providing power to the heating means 120 of one group of blades (e.g. the odd blades). Once it has been detected that the ice 130 has been shed from this group of blades, the method may be performed on the even blades. In this way, not all blades 110 are powered at once and so the amount of power required to de-ice all of the blades of the propeller may be reduced.

In the examples described herein, in order to shed accumulated ice, each group of blades may be individually provided with a de-icing system.

The controller may therefore be configured to allocate power for de-icing to each group of blades 110 (e.g. the "odd" and the "even" blades when a propeller is provided with 6 or 8 blades, or every third blade when there are 9 blades) in turn, depending on the de-icing requirements of the blades 110. Alternatively, all blades 110 may be de-iced simultaneously.

In case of failure of the temperature sensing device of the above system, the de-icing system may operate in a known manner, utilising known de-icing times depending on the ambient conditions such as the CAS and the OAT, using an open loop control system.

Before (for example, during ground start-up) and/or following a de-icing sequence (aircraft out of icing conditions), tests may also be performed to ensure normal operation of the propeller blade 110 de-icing system.

The systems and methods provided herein allow for the propeller blades 110 to be deiced as often as possible, with ice shedding occurring from the first heating cycle with a reduced amount of power. The examples described herein also reduce the amount of heating cycles (and associated cooling phases) required to shed ice from the blades 110, as well as reduce the amount of energy needed prior to the ice 130 being shed. Once the ice 130 has been shed, the immediate detection provided by the examples described herein allows for power consumption to be immediately halted. By providing a controller on the rotary hub of the propeller, the need for signals to be communicated to the aircraft is also reduced. In this way, only an "icing condition" signal needs to be communicated from the aircraft to the propeller, and no "back" communication is necessary.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A method of detecting that ice has been shed from an external surface of a blade of an aircraft propeller, the method comprising:
    applying power to a heating means to provide heat to said external surface;
    sensing the temperature of the blade;
    calculating a rate of change of temperature increase of the external surface over time; and detecting a change in said rate of change of temperature increase over time, wherein said detected change in rate of change of temperature increase indicates that said ice has been shed from said external surface of said blade when a derivative of the sensed temperature exceeds a threshold.

2. The method of claim 1, wherein said aircraft propeller comprises a plurality of said blades and wherein said method further comprises:

allocating said blades into at least a first group and a second group of blades;

wherein said step of providing heat is only performed on said first group of blades whilst no heat is provided to said second group of blades; and wherein upon the detection that said ice has been shed from said first group of blades, reducing or stopping the power to the heating means of the first group of blades whilst applying power to the heating means of a second group of blades.

3. The method of claim 2, wherein said blades are allocated by being numbered sequentially based on their position relative to each other and wherein said first group of blades comprises odd numbered blades and said second group of blades comprises even numbered blades, or vice versa.

4. The method of claim 2, wherein said blades are allocated by being numbered sequentially based on their position relative to each other and wherein the blades are divided into three groups of blades.

5. The method of claim 1, further comprising providing the sensed temperature as feedback to a closed loop controller.

6. The method of claim 1, further comprising:

reducing or stopping the power applied to said heating means after ice has been shed.

7. A system for detecting that ice has been shed from an external surface of a blade of an aircraft propeller, the system comprising:

heating means configured to receive power to provide heat to said external surface;

means for sensing the temperature of the blade; and a controller configured to calculate a rate of change of temperature increase over time wherein said controller is further configured to detect a change in said rate of change of temperature increase over time, and wherein said detected change in rate of change of temperature increase indicates that said ice has been shed from said external surface of said blade when a derivative of the sensed temperature exceeds a threshold.

8. The system of claim 7, wherein upon detection that said ice has been shed from said external surface, the controller is further configured to reduce or stop the power applied to said heating means.

9. The system of claim 7, wherein said aircraft propeller comprises a plurality of said blades;

wherein said blades are allocated into at least a first group and a second group of blades;

wherein said controller is configured to provide heat only to said first group of blades whilst not applying any heat to said second group of blades; and wherein upon the detection that said ice has been shed from said first group of blades, said controller is configured to reduce or stop the power to the heating means of the first group of blades whilst applying power to the heating means of the second group of blades.

10. The system claim 7, wherein said controller is provided on the rotary hub of said propeller.

11. The system of claim 7, wherein said controller is a closed loop controller with component skin temperature feedback.

12. The system of claim 7, wherein said means for sensing the temperature of the component is disposed on an external surface of the component.

13. The system of claim 7, wherein said means for sensing the temperature of the component is disposed within an internal structure of the component.

* * * * *